July 16, 1946.   C. W. GINTER   2,404,051
BLIND RIVETER
Filed Nov. 3, 1943
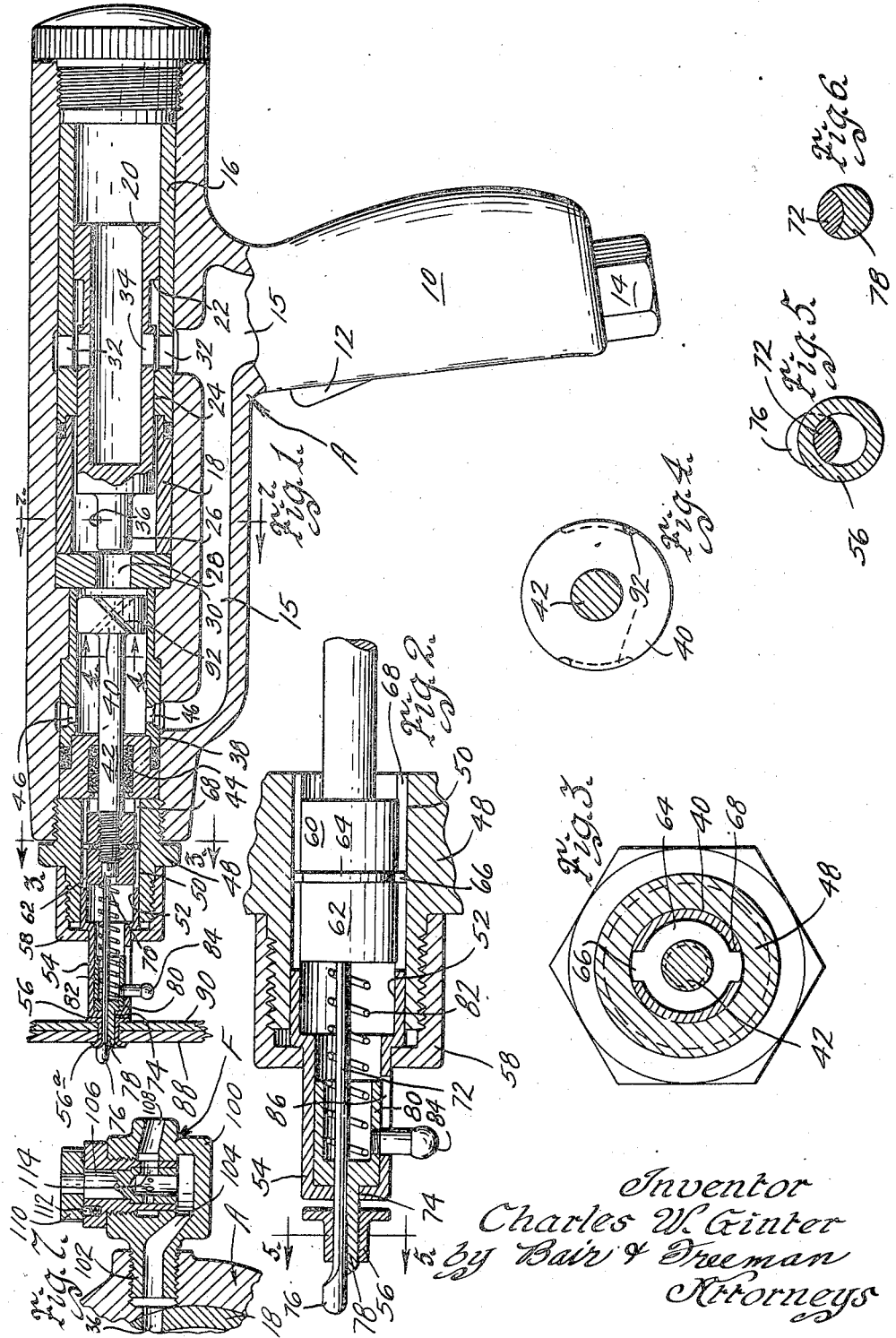
Inventor
Charles W. Ginter
by Bair & Freeman
Attorneys Patented July 16, 1946

2,404,051

UNITED STATES PATENT OFFICE 2,404,051

BLIND RIVETER

Charles W. Ginter, Bryan, Ohio, assignor to The Aro Equipment Corporation, Bryan, Ohio, a corporation of Ohio Application November 3, 1943, Serial No. 508,814

8 Claims. (Cl. 218—19)

My present invention relates to a blind riveter of the pneumatically operated type, wherein the riveting is accomplished by a series of impact blows imparted to a peening stem.

One object of the invention is to provide a riveting device, which is inexpensive and simple to construct and is particularly adapted for use in connection with aircraft riveting, especially thin sections, such as wing tips, aileron edges, etc. It can also be used for riveting the skin on the framework of the airplane or for riveting two layers of skin together.

Another object is to provide a riveter for use on light structures being riveted, particularly those fabricated of sheet metal, which eliminates the necessity of using a buckling bar on the opposite side of the structure from the riveting tool.

Still another object is to provide a pneumatically operated riveting device, wherein a tubular rivet may be peened by means of a peening stem projecting through the bore of a tubular rivet, and having a peening head on the opposite side from the tool, the tool itself having an anvil connected therewith for bucking the rivet in opposition to the action of the peening head.

Still another object is to provide a pneumatic means of impact type for operating the peening mechanism and to design the structure so that rotation of the anvil and peening stem occurs during operation for peening the rivet all the way around its circumference.

A further object is to provide a riveting tool which is readily adjustable as to its riveting action or rate of operation by means of an adjustable fitting to regulate the flow of compressed air through the tool.

With these and other objects in view, my invention consists in the construction and arrangement of the various parts of my blind riveter, whereby the objects contemplated are attained, as hereinafter more fully set forth, pointed out in my claims, and illustrated in the accompanying drawing, in which:

Figure 1 is a partial, sectional view of a pneumatically operated blind riveter embodying my invention, the device being shown peening a rivet through two layers of sheet metal or the like.

Figure 2 is an enlarged sectional view of the forward portion of the riveter, showing the parts in a different position, as when a rivet is being placed thereon.

Figure 3 is an enlarged, sectional view on the line 3—3 of Figure 1, showing a slidable and non-rotatable connection between a piston rod and an anvil in my riveting structure.

Figure 4 is an enlarged, sectional view on the line 4—4 of Figure 1, showing a piston and stem and illustrating particularly spiral grooves in the periphery of the piston.

Figure 5 is a further enlarged, sectional view on the line 5—5 of Figure 2, showing the relation of the peening stem and head to the bore of the rivet before a backing element enters the bore.

Figure 6 is a further enlarged, sectional view on the line 6—6 of Figure 2, showing only the backing element and the peening stem and their association with each other to fit the bore of the rivet; and Figure 7 is a sectional view on the line 7—7 of Figure 1.

On the accompanying drawing, I have used the reference character A to indicate in general a blind riveter embodying my invention. The riveter A has a hand grip 10, provided with a trigger 12, which may operate a suitable inlet valve, not shown, for admitting compressed air from a fitting 14 into a passageway 15 under control of the operator. The fitting 14, of course, is connected with a compressed air line or hose in the usual manner.

Within the riveter A, I provide a pair of cylinder sleeves 16 and 18 in which a pneumatic hammer type piston 20 reciprocates. The piston 20 has an enlarged head 22 fitting the cylinder 16 and the piston extends loosely into the cylinder 18, after passing through a restriction 24 of the cylinder 16, dividing it from the cylinder 18. Within the cylinder 18, the piston 20 has a reduced portion 26 constituting a hammer. This portion is adapted at times to extend through a bore 28 of a closure disc 30 for the forward end of the cylinder 18.

The cylinder 16 is provided with inlet ports 32 communicating with the passageway 15 in the riveter A. The piston 20 is also provided with inlet ports 34. The cylinder 18 is provided with an exhaust port 36 which in actual practice may be adjustable as to size for controlling the speed of operation of the piston 20. By way of example, an ordinary needle valve may be screwed into the opening 36, or a control fitting F of the kind shown in Figure 7 may be used. The fitting F consists of a body 100 having an end 102 threaded into the body of the riveting tool and communicating with opening 36. The body 100 has a passageway 104 leading to the interior of a valve stem 106, and an exhaust passageway 108 extending from the periphery of the valve stem to atmosphere.

The valve stem may be rotated to any one of several positions by a control knob 110, spring pressed ball detent 112 being used to index the knob in the various positions. The valve stem is then provided with a series of ports 114 of different sizes to regulate the exhaust air and, thereby, the action or rate of operation of the riveting tool. The rate of operation can alternatively be changed by inserting a valve like the one shown in Figure 7 between the source of air supply and the inlet fitting 14.

Ahead of the closure disc 30 is a cylinder sleeve 38. Reciprocable therein is a piston 40 having a piston rod 42. The piston rod 42 extends through a packing 44 at the forward end of the cylinder 38.

The passageway 15 also communicates with the cylinder 38 ahead of the piston 40. For this purpose, inlet ports 46 are provided.

Ahead of the packing 44, I provide a closure nut 48, which has a bore 50. Slidable in the bore 50 is a sleeve 52 having a reduced portion 54 constituting at its forward end an anvil for bucking a rivet 56. The sleeve 52 and the anvil 54 are retained rigidly in the bore 50 of the closure nut 48 by means of a union nut 58.

Within the bore 50 is a pair of lock nuts 60 and 62, threaded on the piston rod 42 with a washer 64 between them. The washer 64, as shown in Figure 3, has a pair of fingers 66 freely slidable in longitudinal slots 68 of the sleeve 52. The lock nut 62 has a cavity therein receiving a head 70 of a peening stem 72. The stem 72 extends through an opening 74 in the anvil 54 and terminates in a peening head 76. Also in the opening 74, I provide a peening stem backing element 78 having a cupped head 80 slidable in the anvil sleeve 54. A spring 82 is interposed between the bottom of the socket in the head 80 and the lock nut 62. The spring 82 normally holds the peening stem backing element 78 in its forward position as in Figure 1. The backing element may be retracted, however, manually against the action of the spring 82 by engaging a knob-like pin 84 extending from the head 80 through a slot 86 in the anvil sleeve 54.

*Practical operation*

In the operation of my device, while the air is off, the rivet 56 may be placed on the peening stem as in Figure 2, while the backing element 78 is held back out of the way by the operator engaging and pushing rearwardly on the pin 84. This gives room for the rivet to pass over the peening head 76 as in Figure 5 and rest on the stem 72. Thereafter the pin may be released and the backing element 78 will enter the bore of the rivet 56 and substantially fill the bore as in Figure 2 (the rivet not yet being inserted in place for riveting).

The two engaging sheets of metal are shown at 88 and 90, and they have been previously drilled or punched to receive the rivet. The rivet together with the peening stem and head and the peening stem backing element may all enter through the holes in the sheet metal, due to the relative sizes and positions, as obvious from Figure 1 of the drawing. When the backing element 78 is permitted to move under action of the spring 82 into the rivet, the backing element and peening stem, together, form in effect a rod of substantially the same diameter as the interior of the rivet as shown in Figure 6. This rigidly holds the rivet against lateral movement and offsets the head 76 (same position as shown in Figure 5) so that subsequent impact blows of this head against the inner end of the rivet will peen over the edge thereof, as indicated at 56a in Figure 1.

Some means must be provided to rotate the peening head so as to peen the rivet all the way around its periphery. I accomplish this by merely forming spiral grooves 92 in the piston 40 as shown in Figures 1 and 4. The air entering from the passageway 16 and the ports 46 into the cylinder 38 tends normally to drive the piston 40 rearwardly to the position of Figure 1, thus engaging the peening head 76 with the edge of the rivet. To drive the piston back in the other direction, the impact piston 20 operates to deliver a series of impact blows to the piston 40, thus permitting it to in turn deliver impact blows through the head 76 against the rivet to peen it, when the piston 20 moves rearwardly in its cylinders 16 and 18. Each time the piston 40 is jarred, it will rotate slightly, due to the compressed air flowing through the spiral grooves 92. The flow of air occurs in the form of impulses, due to the hammer element 26 of the piston alternately entering and leaving the opening 28 in the closure member 30, the air through the grooves 92 exhausted through the exhast port 36.

The riveting operation, of course, is at all times under control of the operator by merely pressing the trigger 12 to admit air for the riveting operation and releasing the trigger to cut off the air at the completion thereof. The piston 20 is of the usual construction found in pneumatic hammers and operates substantially as follows:

In the present position of the parts, air through the ports 32 and 34 acts on the back of the piston 20 to drive it forwardly in opposition to air entering through ports 46, grooves 92 and opening 28, the forward portion of the piston 20 being smaller in diameter than the rearward portion thereof. When the ports 34 pass the restriction 24 on the forward stroke, exhaust occurs into the cylinder 18 and out of the exhaust port 36. This permits the piston 20 to be forced back by air through the ports 32 engaging the front of the enlargement 22, after the hammer 26 has delivered a blow to the piston 40. On the return stroke, the ports 34 after passing the restriction 24 again connect the compressed air supply with the back of the piston 20 for cushioning the return stroke and effecting another forward motion of the piston.

The foregoing described cycles of operation are repeated rapidly, the speed depending upon the size of the opening 36 through which the air exhausts to atmosphere. By adjusting the fitting F the effective size of the opening 36 may be changed to secure different rates of operation as desired or required.

From the foregoing specification, it will be obvious that I have provided a relatively simple blind riveter, wherein pneumatically operated impact means is provided for operating the peening element of the riveter. Some changes may be made in the arrangement and construction of the various parts of my riveter, without departing from the real spirit and purpose of my invention, and it is my intention to cover by my claims, any modified forms of construction or use of mechanical equivalents, which may be reasonably included therein.

I claim as my invention:

1. A blind riveter comprising a peening stem having a peening head adapted to extend through the bore of a tubular rivet, a stem backing element adapted for entering said bore and together with said stem substantially filling the same, an anvil for bucking the rivet, pneumatically operated means adapted to intermittently draw said peening head toward said rivet and said rivet against said anvil to peen the rivet, and pneumatically operated means for opposing the first pneumatic means.

2. A blind riveter comprising a peening stem having a peening head adapted to extend through the bore of a tubular rivet, a stem backing element adapted for entering said bore and together with said stem substantially filling the same, an anvil for bucking the rivet, pneumatically operated means adapted to intermittently draw said peening head toward said rivet and said rivet against said anvil to peen the rivet, pneumatically operated means for opposing said first pneumatically operated means, and pneumatic means to rotate said peening head.

3. In a blind riveter, a peening stem having a peening head adapted to extend through the bore of a tubular rivet, a stem backing element adapted to enter said bore and together with the stem to substantially fill the bore, an anvil for bucking the rivet, pneumatically operated means adapted to draw said peening head against said rivet to peen the same by a plurality of impact blows delivered thereon directly from said pneumatically operated means, and means controlled by the operator for rendering said pneumatically operated means operable or inoperable.

4. In a blind riveter, the combination with an anvil for bucking a rivet, a rivet peening stem and head, and a stem backing element; of pneumatically operated means tending to move said peening head in a peening direction, and pneumatically operated impact means adapted to drive said pneumatically operated means in the opposite direction.

5. In a blind riveter, the combination with an anvil for bucking a rivet, a rivet peening stem and head, and a stem backing element; of pneumatically operated means tending to move said peening head in a peening direction, and pneumatically operated impact means adapted to alternately drive said pneumatically operated means in the opposite direction and release it for return by said first pneumatically operated means.

6. In a blind riveter, the combination with an anvil for bucking a rivet, a rivet peening stem and head, and a stem backing element; of pneumatically operated means tending to move said peening head in a peening direction, and pneumatically operated impact means adapted to strike said pneumatically operated means and move it in the opposite direction and thereby release said peening head from contact with the rivet.

7. A blind riveter comprising the combination with an anvil for bucking a rivet, a rivet peening stem and head, and a stem backing element; of pneumatically operated means tending to move said peening head in a peening direction, and pneumatically operated impact means adapted to intermittently oppose said first pneumatically operated means.

8. A blind riveter comprising a peening stem having a peening head adapted to extend through the bore of a tubular rivet, a stem backing element adapted for entering said bore and together with said stem substantially filling the same, an anvil for bucking the rivet, pneumatically operated means adapted to intermittently draw said peening head toward said rivet and said rivet against said anvil to peen the rivet, pneumatically operated means for periodically releasing said peening head from the rivet, and means for controlling the rate of operation of said last pneumatically operated means.

CHARLES W. GINTER.